UNITED STATES PATENT OFFICE.

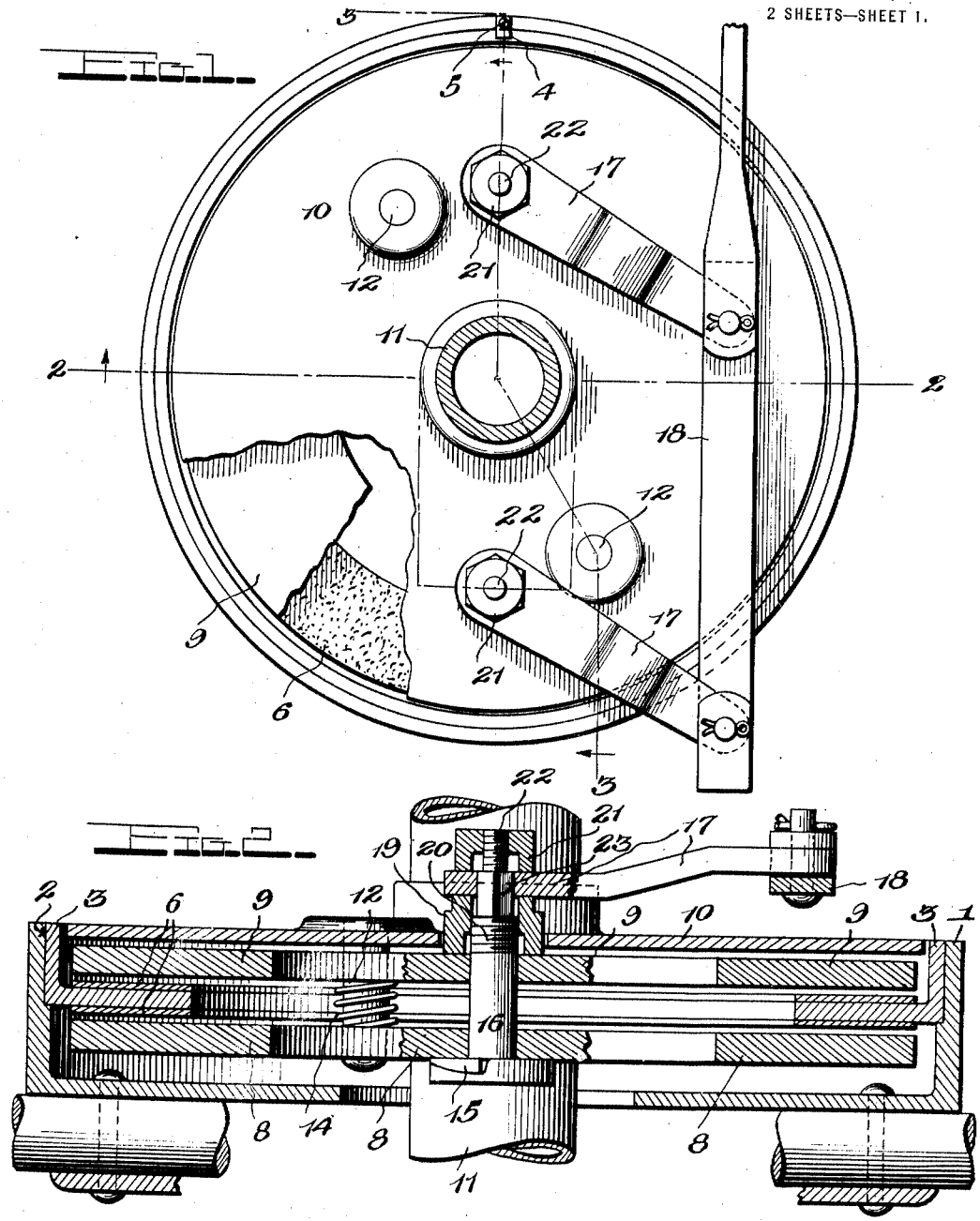

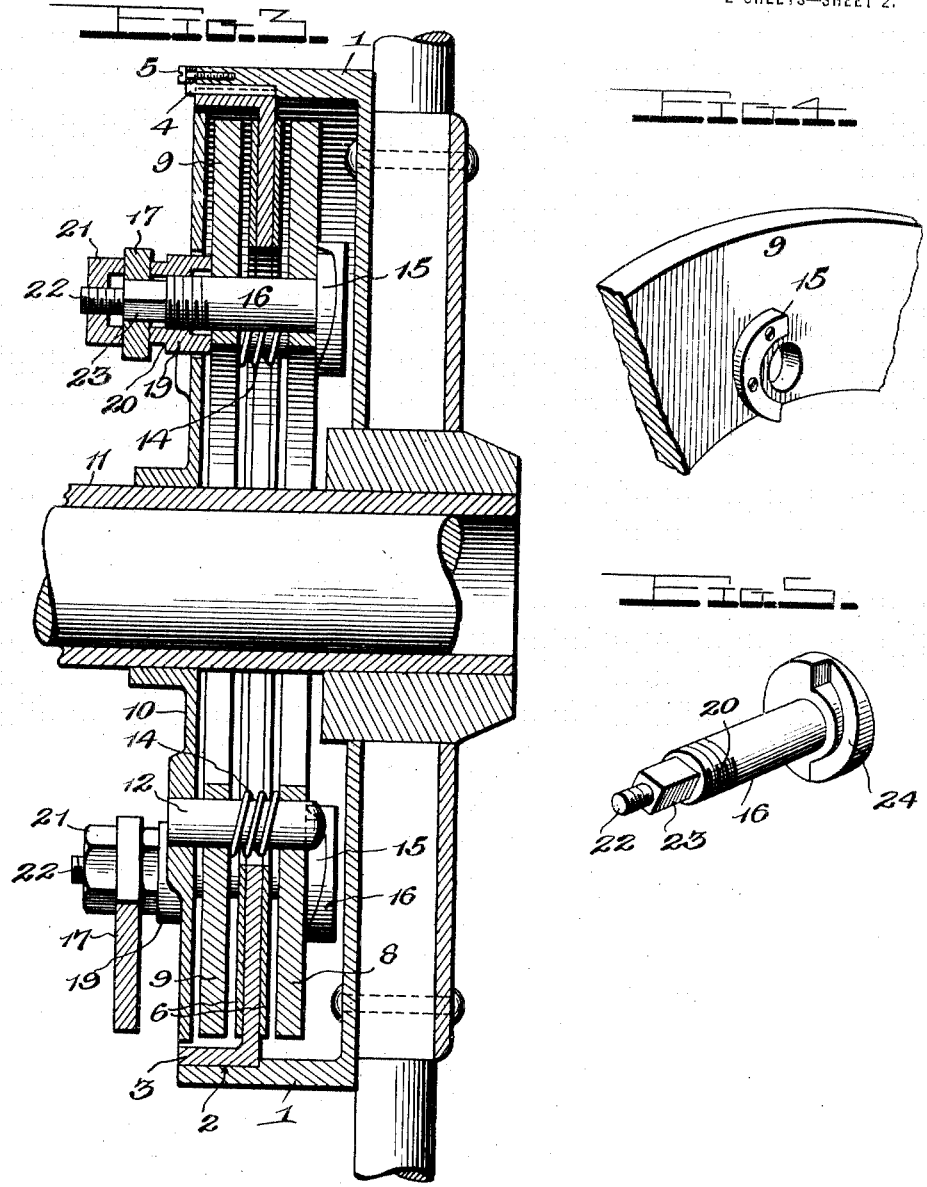

HENRY A. LUCE AND ORA SONNERS, OF CODY, WYOMING.

INTERNAL BRAKE.

1,334,253.  Specification of Letters Patent.  Patented Mar. 16, 1920.

Application filed August 3, 1916, Serial No. 112,953. Renewed January 15, 1920. Serial No. 351,699.

*To all whom it may concern:*

Be it known that we, HENRY A. LUCE and ORA SONNERS, citizens of the United States, residing at Cody, in the county of Park and State of Wyoming, have invented a new and useful Internal Brake, of which the following is a specification.

The object of our invention is to provide a brake well suited for use on automobiles; to provide a brake having a very large braking area so as to minimize friction and increase the life of the brake lining; and to attain these objects by a construction having a comparatively small number of parts arranged to operate in a simple and efficient manner.

We attain the objects of our invention by the mechanism illustrated in the accompanying drawings, in which—

Figure 1 is a view of the exterior of the brake with parts broken away to show the interior; Fig. 2 is a section on line 2—2 of Fig. 1; Fig. 3 is a section on line 3—3 of Fig. 1; Fig. 4 is a detail of one of our cam members; Fig. 5 is a perspective view of our cam shaft.

Like characters of reference designate like parts in each of the views.

Referring to the accompanying drawings, we provide a casing 1 having a recessed portion 2 in which is mounted a flanged brake disk 3. The flanged brake disk 3 is prevented from turning in casing 1 by means of a key 4, which is held in place by screws 5, as shown in Fig. 3. Inner drum 3 is provided with lining members 6 to provide braking surfaces, against which braking disks 8 and 9 contact when the brake is applied. A suitable dust cover 10 is provided exterior to brake disk 9 mounted on the axle housing 11. We provide posts 12 solidly attached to dust cover 10 and projecting through alined orifices 13 in brake disks 8 and 9, as illustrated. We further provide suitable coil springs 14 on posts 12, positioned between brake disks 8 and 9, to bear against those parts to hold them in their proper position when the brake is not in operation. Attached to brake disk 8 we provide a suitable cam 15, as shown in Figs. 2, 3 and 4 operatively engaging cam portions 24 of shaft 16. Two cam shafts 16 and cams 15 are provided on spaced portions of the brake as shown in Fig. 1. Cam shafts 16 are attached to connecting levers 17, which in turn are operated by brake lever 18. In order that each of the cam shafts 16 may be readily adjusted we provide an adjusting collar 19 engaging threaded portion 20 of cam shaft 16, and a locking nut 21 engaging threaded end 22 of cam shaft 16. Lever 17 which engages an angular portion 23 of cam shaft 16 is held in the desired adjusted position by adjusting collar 19 and locking nut 21. Lever 17 may be slid axially for adjustment. Casing 1 in addition to its special function is utilized for the application of an external brake in the usual manner.

The operation of the invention is as follows: Casing 1 is attached to and revolves with the ground wheel. Flanged brake disk 3 is mounted in the recessed portion of member 1, as shown, and is prevented from turning in member 1 by key 4 which is held in place by screw 5. To apply the brake, lever 18 is operated, turning levers 17 which are secured in rigid adjusted engagement to cam shafts 16. As cam shafts 16 are turned their cam portions bear against cams 15 which are affixed to brake disk 8 and which cause it to move axially and press against the adjacent lining 6 of flanged brake disk 3, which is thereby pressed outwardly so that it will bear against brake disk 9, the outward movement of which is limited by the adjusting collar 19, as shown in Fig. 2. When the brake lever is released the coil springs 14 on posts 12 operate to spread brake disks 8 and 9 apart so as to assume their normal spaced relation relative to flanged brake disk 3. Brake disks 8 and 9, together with cam shafts 16 and the parts attached to them are free to float axially, while circumferentially they are held to predetermined position by posts 12, which extend through each of the brake disks 8 and 9 and are attached to dust cover 10. This combination of parts makes our device very elastic and capable of adjusting itself to varying conditions of the car, such as spring of the parts under heavy strain, and improper adjustment of the wheels.

What we claim is:

1. In a vehicle brake, the combination of a casing, a flanged brake disk axially but not circumferentially movable relative to the casing, adjustable braking members on opposite sides of the flanged brake disk, and means for controlling their operation, including a cam, a cam shaft having a cam portion at one end, a threaded portion spaced from the cam portion, an angular portion beyond the threaded portion and a threaded end beyond the angular portion, an adjusting collar engaging the first-mentioned threaded portion, an axially adjustable lever engaging an angular portion, and a locking nut engaging the threaded end, for the purposes set forth.

2. The combination of a casing, a flanged brake disk axially movable relative to the casing, means securing the flanged brake disk against circumferential movement independent of the casing, braking members normally out of engagement with the flanged brake disk but axially movable, cam mechanism operatively engaging one of the braking members to move the same axially to apply the brake, a cover member exterior to the braking members and means affixed to the cover member for holding the braking members against independent circumferential movement but permitting free axial movement, substantially as set forth.

3. A vehicle brake having a casing, a flanged brake disk axially movable within the casing, braking disks arranged to frictionally engage the flanged brake disk, and means for adjustably controlling the operation of the aforesaid members, including the combination of spaced levers, means for operating the levers simultaneously, cam shafts having angular portions to which the levers are adjustably engaged, means for adjusting the levers on the cam shaft comprising an adjusting collar having threaded engagement with the cam shaft, and a locking nut having threaded engagement with the end of the cam shaft, each lever being adjustably engaged between the adjusting collar and cam shaft to permit of axial adjustment.

HENRY A. LUCE.
ORA SONNERS.